(12) United States Patent
Kim et al.

(10) Patent No.: US 11,142,256 B2
(45) Date of Patent: Oct. 12, 2021

(54) FENDER APRON ASSEMBLY FOR VEHICLE

(71) Applicants: HYUNDAI MOTOR COMPANY, Seoul (KR); KIA MOTORS CORPORATION, Seoul (KR)

(72) Inventors: Do Hoi Kim, Seoul (KR); Joong Hyun Shin, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 32 days.

(21) Appl. No.: 16/743,893

(22) Filed: Jan. 15, 2020

(65) Prior Publication Data
US 2021/0061361 A1 Mar. 4, 2021

(30) Foreign Application Priority Data
Aug. 29, 2019 (KR) .................. 10-2019-0106271

(51) Int. Cl.
*B62D 25/04* (2006.01)
*B62D 25/08* (2006.01)
*B62D 27/02* (2006.01)
*B62D 25/18* (2006.01)

(52) U.S. Cl.
CPC .......... *B62D 25/04* (2013.01); *B62D 25/081* (2013.01); *B62D 25/18* (2013.01); *B62D 27/02* (2013.01)

(58) Field of Classification Search
CPC ................. B62D 25/04; B62D 25/08
USPC ........... 296/203.01, 203.02, 193.06, 187.09, 296/187.1
See application file for complete search history.

(56) References Cited

U.S. PATENT DOCUMENTS

| 8,905,444 B2 * | 12/2014 | Zannier | B60R 19/34 293/132 |
| 2014/0097640 A1 * | 4/2014 | Chung | B62D 25/163 296/187.1 |
| 2018/0251163 A1 * | 9/2018 | Martin | B62D 29/008 |

FOREIGN PATENT DOCUMENTS

KR 10-2019-0016692 A 2/2019

* cited by examiner

*Primary Examiner* — Dennis H Pedder
(74) *Attorney, Agent, or Firm* — Morgan, Lewis & Bockius LLP

(57) ABSTRACT

A fender apron assembly for a vehicle may include an apron member mounted over a front wheel of the vehicle, formed to extend in the longitudinal direction of the vehicle, and formed by extrusion; and a pillar member forming an A-pillar of the vehicle, extending along a longitudinal direction of the vehicle, formed in a pipe shape, and having a front end portion connected to the rear of the apron member.

15 Claims, 4 Drawing Sheets

FENDER APRON ASSEMBLY FOR VEHICLE

CROSS-REFERENCE TO RELATED APPLICATION

The present application claims priority to Korean Patent Application No. 10-2019-0106271, filed on Aug. 29, 2019, the entire contents of which is incorporated herein for all purposes by this reference.

BACKGROUND OF THE INVENTION

Field of the Invention

The present invention relates to a fender apron assembly for a vehicle that enables modularization of various kinds of vehicles, makes it easy to change design, and can satisfy necessary performance.

Description of Related Art

Recently, a lot of modularized vehicle bodies have been developed and applied due to the trend of electric operation of vehicles and requirement for reducing manufacturing cost.

However, when the kind of a vehicle is changed, it is required to change the design again due to spatial limits in design of the passenger compartment even if the length of the vehicle body is increased. When the design is changed, the molds for panels may be changed, so there is a limit in manufacturing of vehicles in the concept of a smart factor, and much cost is needed.

Accordingly, for the portions that require many parts such as panels in vehicles, it is required to change design such that a change of molds is not necessary by designing the molds through engineering methods other than pressing.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a fender apron assembly for a vehicle that enables modularization of various kinds of vehicles, makes it easy to change design, and can satisfy necessary performance.

To solve the above problems, a fender apron assembly for a vehicle according to an exemplary embodiment of the present invention includes: an apron member mounted over a front wheel of the vehicle, formed to extend in the longitudinal direction of the vehicle, and formed by extrusion; and a pillar member forming an A-pillar of the vehicle, extending along a longitudinal direction of the vehicle, formed in a pipe shape, and having a front end portion connected to the rear of the apron member.

The apron member may be formed longitudinally in a lattice-shaped or honeycomb-shaped cross-section by extrusion.

The pillar member may have a curved shape which is curved along an A-pillar layout of the vehicle, and may be formed through hot-blowing, hydro-forming, or pipe-bending.

The pillar member may have a pillar portion forming an A-pillar of a vehicle, and a coupling portion extending forward from a front end portion of the pillar portion and coupled to the apron member.

The pillar portion may diagonally extend and the coupling portion may bend at the front end portion of the pillar portion, may extend forward, and may be a straight section.

The pillar member may be coupled with a front end portion seated on a rear top of the apron member.

The apron member may have a seat having a recessed cross-section and formed at a portion facing the outside from a vehicle of an upper portion thereof, and the pillar member may be combined with the apron member with a front end portion thereof seated on the seat.

The apron member may have an extending portion which is formed by extrusion and extends toward a front of a vehicle.

The apron member may further have as supporting portion which is coupled to a rear of the extending portion, is formed by extrusion, and has an end portion finished with a flange portion.

The pillar member may be coupled with a front end portion seated on a top of the extending portion of the apron member in surface contact with the supporting portion.

The extending portion may be diagonally cut such that an up and down height of the front end portion decreases.

The apron member may be formed by combining a plurality of pipes.

According to the fender apron assembly for a vehicle of the present invention, it is possible to modularize various kinds of vehicles, it is easy to change design, and it is possible to satisfy necessary performance.

According to an exemplary embodiment of the present invention, it is possible to easily extend the fender apron in the longitudinal direction thereof, so that the fender apron assembly may be used for various kinds of vehicles as a variable structure.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
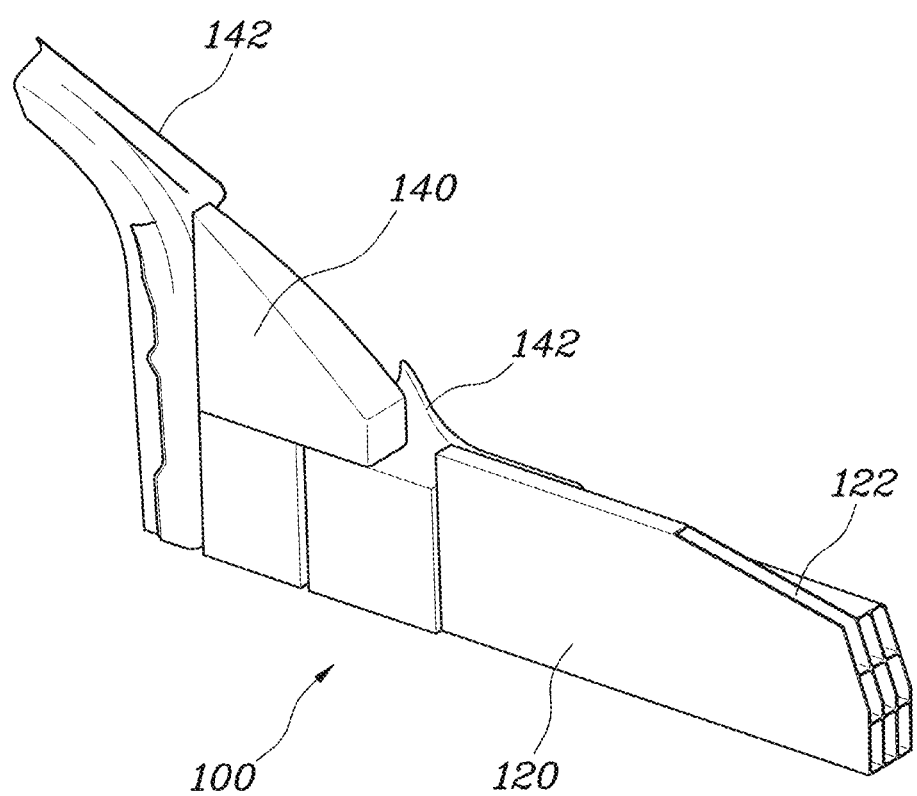
FIG. 1 is a view showing an apron member of a fender apron assembly for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
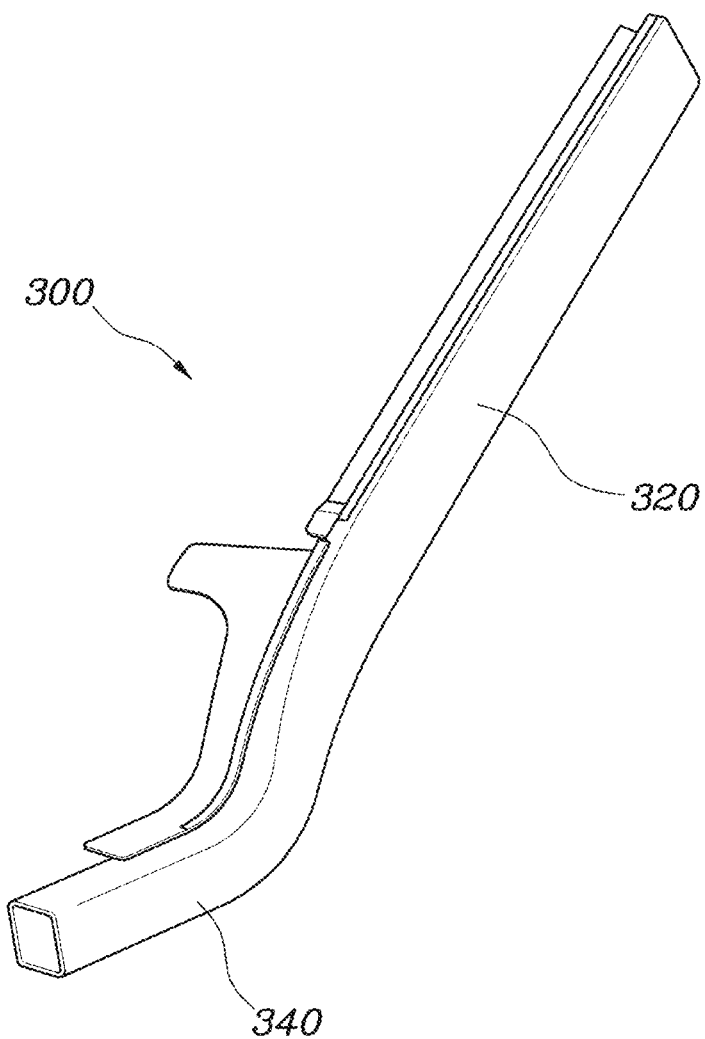
FIG. 2 is a view showing a pillar member of the fender apron assembly for a vehicle according to an exemplary embodiment of the present invention.
Figure 3:
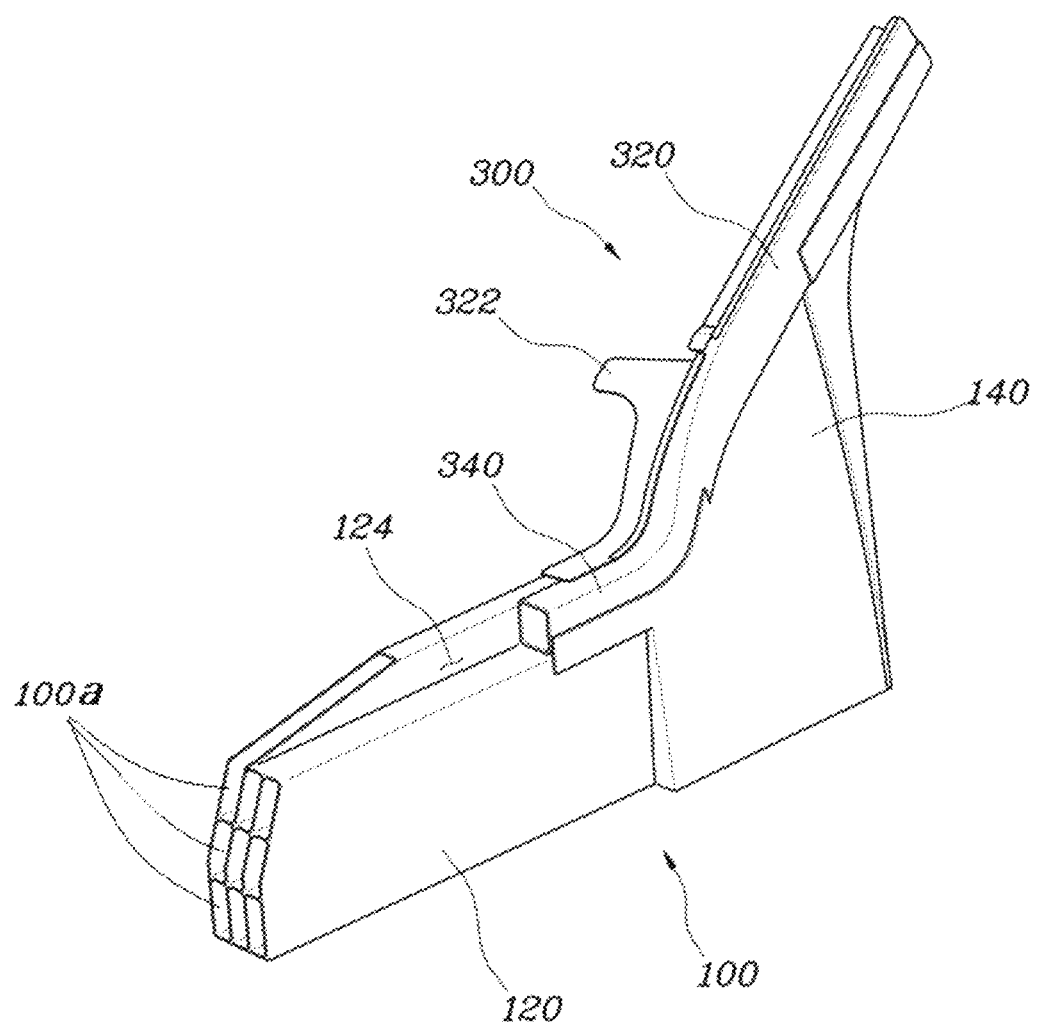
FIG. 3 is a perspective view of the fender apron assembly for a vehicle according to an exemplary embodiment of the present invention.
Figure 4:
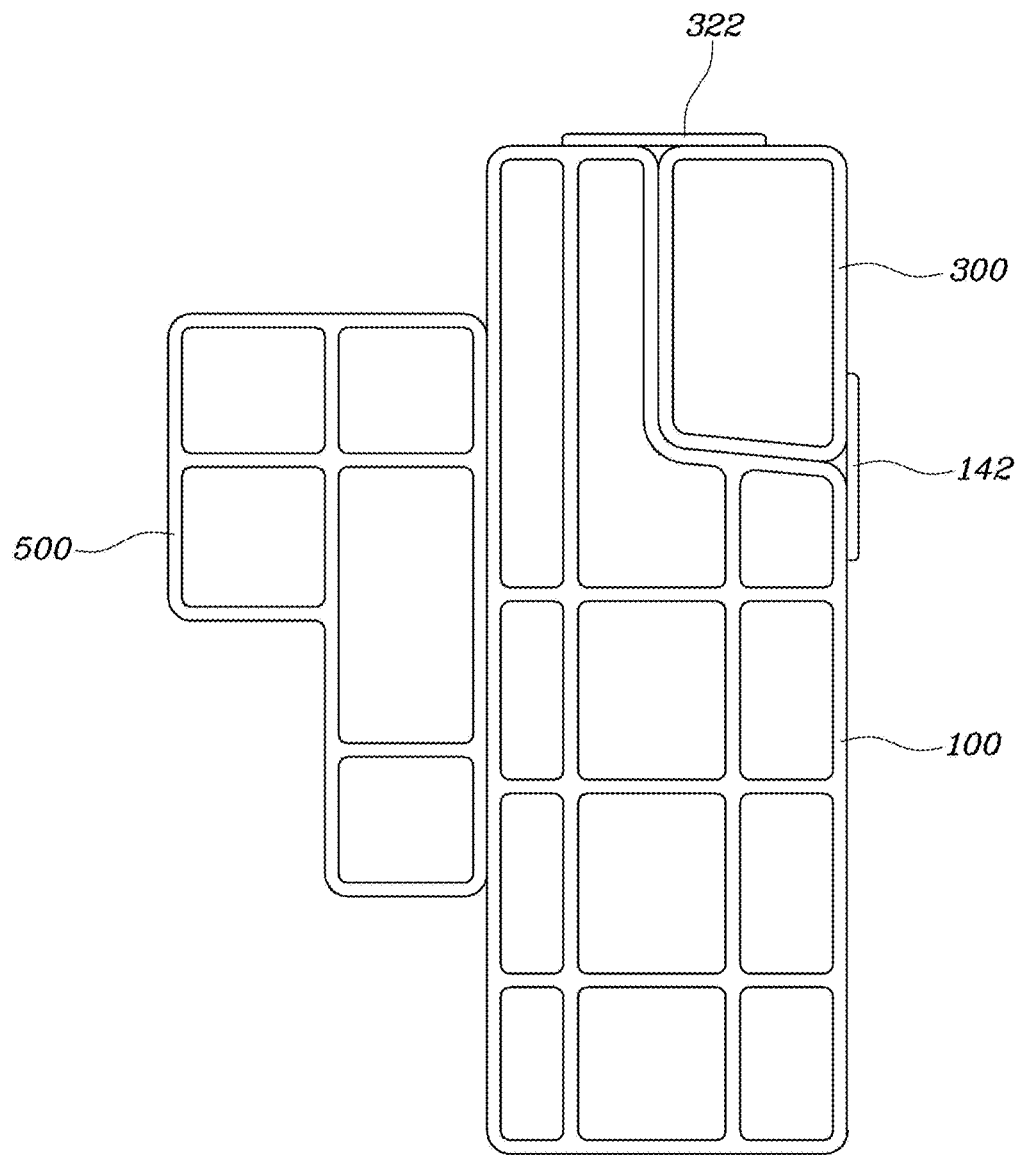
FIG. 4 is a cross-sectional view of the fender apron assembly for a vehicle of FIG. 3.

FIG. 1 is a view showing an apron member of a fender apron assembly for a vehicle according to an exemplary embodiment of the present invention, FIG. 2 is a view showing a pillar member of the fender apron assembly for a vehicle according to an exemplary embodiment of the present invention, FIG. 3 is a perspective view of the fender apron assembly for a vehicle according to an exemplary embodiment of the present invention, and FIG. 4 is a cross-sectional view of the fender apron assembly for a vehicle of FIG. 3.

A fender apron assembly for a vehicle according to an exemplary embodiment of the present invention includes: an apron member 100 mounted over a front wheel of the vehicle, formed to extend in the longitudinal direction of the vehicle, and formed by extrusion; and a pillar member 300 forming an A-pillar of the vehicle, extending along a longitudinal direction of the vehicle, formed in a pipe shape, and having a front end portion connected to the rear of the apron member 100.

According to an exemplary embodiment of the present invention, since a fender apron of a vehicle is manufactured and coupled using extrusion, there is no demand for a specific mold unlike pressing forming for plates in the related art. Furthermore, even if it is required to change the design due to a change of the kind of a vehicle, it is only required to implement a variable length, so it is possible to easily apply the fender apron to various kinds of vehicles by manufacturing the fender apron through extrusion using the same extrusion equipment and then cutting the length in accordance with necessity.

The fender apron assembly of the present invention includes the apron member 100 and the pillar member 300 in a broad meaning. The apron member 100 is mounted over a front wheel of a vehicle, has a shape extending in the longitudinal direction of the vehicle, and is formed by extrusion. Alternatively, the apron member 100 may have the same structure as an extrudate formed as a single unit by combining a plurality of pipes 100a formed by an engineering method other than extrusion.

In detail, the apron member 100 may be formed longitudinally in a lattice-shaped or honeycomb-shaped cross-section by extrusion. Extrusion has the advantage that it is possible to achieve extrudates with various lengths using one mold, so it is advantageous in manufacturing of various kinds of vehicles. Furthermore, it is possible to make the cross-sectional shape in various shapes such as a lattice shape and a honeycomb shape in accordance with the shapes of molds, it is possible to secure necessary strength.

FIG. 1 is a perspective view of the apron member 100 and FIG. 4 is a cross-sectional view. The apron member 100 has a seat 124 having a recessed cross-section and formed at a portion facing the outside from the vehicle of the upper portion thereof. The pillar member 300 may be combined with the apron member 100 with the front end portion thereof seated on the seat 124. Accordingly, it is possible to achieve a natural design of the vehicle that continues from the A-pillar to the apron and the A-pillar is combined while being supported on the apron by the present structure, whereby the coupling strength therebetween is increased.

A cowl member 500 is coupled to the internal side of the apron member 100 while supporting the apron member, and the cowl member 500 can also be formed to have a lattice-shaped cross-section by extrusion.

The apron member 100 may have an extending portion 120 which is formed by extrusion and extends toward the front of a vehicle, and a supporting portion 140 which is coupled to the rear of the extending portion 120, is formed by extrusion, and has a cut end portion finished by a flange portion formed by forming, etc. The extending portion 120 is extruded in a straight shape by extrusion and is a main portion in terms of strength.

The inside structure of the supporting portion 140 is formed by extrusion and then cut to have appropriate length and curved surface. The cut end portion is finished by coupling a flange portion, which is formed by plate-pressing, roll forming, or molding to have a curved or flat shape, through welding or bonding. Accordingly, the external shape of the supporting portion 140 may have a curved surface rather than a flat surface. Accordingly, even if an extrudate is used, it is possible to achieve curved design of a vehicle and to form the flange 142 to which the pillar member 300 may be fastened.

In detail, the pillar member 300 may be combined in surface contact with the supporting portion 140 with the front end portion thereof seated on the top portion of the extending portion 120 of the apron member 100. As shown in the figures, various shapes of flanges 142 may be formed at the supporting portion 140, and accordingly, the front end portion of the pillar member 300 is seated on the seat 124 and is in surface contact with the supporting portion 140, whereby stable coupling is possible. The extending portion 120 and the supporting portion 140 may be coupled to each other by welding, etc.

The extending portion 120 may be cut (122) diagonally at the front end portion such that the up-down height decreases. Accordingly, it is possible to form the front end portion of the apron in a shape that fits to the design of a vehicle, which may be achieved through laser cutting.

The apron member 100 and the pillar member 300 in an exemplary embodiment of the present invention may include a metal material such as steel or aluminum.

The pillar member 300 forms the A-pillar of a vehicle, has a shape longitudinally extending, is formed in a pipe shape, and has a front end portion connected to the rear of the apron member 100.

In detail, as shown in FIG. 2, the pillar member 300 has a curved shape which is curved along the A-pillar layout of a vehicle. Such a pipe having a curved shape may be formed through hot-blowing, hydro-forming, or pipe-bending.

That is, the pillar member 300 is formed by bending one pipe in a curved shape such that portions have different cross-sectional areas, rather than having a lattice-shaped cross-section like the apron member 100, so it is possible to design the pillar member 300 such that the portions have different thicknesses and cross-sections and different strengths.

The pillar member 300 may have a pillar portion 320 forming the A-pillar of a vehicle, and a coupling portion 340 extending forward from the front end portion of the pillar portion 320 and coupled to the apron member 100.

The pillar portion 320 implements an A-pillar by diagonally extending and the coupling portion 340 bends at the front end portion of the pillar portion 320 and then extends forward, in which the coupling portion 340 may be a straight section. The pillar member 300 may be coupled with the front end portion seated on the rear top of the apron member 100. In detail, since the coupling portion 340 of the pillar member 300 is a straight section, the coupling portion 340 may be seated on the extending portion 120 and the seat 124 of the apron member 100 and may be coupled to be surrounded by the flange 142.

To securely combine the apron member 100 and the pillar member 300 with each other, the flange 142 of the supporting portion 140 supports a side of the coupling portion 340 of the pillar member 300, and a separate bracket 322 is coupled to the upper end portion of the coupling portion 340 of the pillar member 300 and is coupled also to the upper end portion of the apron 300. Accordingly, the pillar member 300 may be combined in a way it is surrounded by the apron member 100.

According to an exemplary embodiment of the present invention, since most portions of an apron assembly are formed in a pipe shape through extrusion, the number of molds which may be commonly used in accordance with the kinds of vehicles is maximized. Accordingly, even if the kind of vehicle is changed, it is easy to change the design and it is possible to reduce the manufacturing cost because the cost for molds is reduced. Furthermore, even though the portions are formed in a pipe shape, the strength which is required in the related art is secured and it is possible to achieve a curved design of a vehicle.

According to the fender apron assembly for a vehicle of the present invention, it is possible to modularize various kinds of vehicles, it is easy to change design, and it is possible to satisfy necessary performance.

According to an exemplary embodiment of the present invention, it is possible to easily extend the fender apron in the longitudinal direction thereof, so that the fender apron assembly may be used for various kinds of vehicles as a variable structure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A fender apron assembly for a vehicle, the assembly comprising:
    an apron member mounted over a wheel of the vehicle and formed to extend in a longitudinal direction of the vehicle; and
    a pillar member forming an A-pillar of the vehicle, extending along the longitudinal direction of the vehicle, formed in a pipe shape, and having a front end portion connected to the apron member,
    wherein the apron member has a seat including a recessed cross-section and formed at a portion facing the outside from the vehicle at an upper portion of the apron member, and the pillar member is combined with the apron member with the front end portion of the pillar member seated on the seat.

2. The fender apron assembly of claim 1, wherein the apron member is formed along a longitudinal direction of the apron member in a lattice-shaped or honeycomb-shaped cross-section by extrusion.

3. The fender apron assembly of claim 1, wherein the pillar member has a curved shape which is curved along a layout of the A-pillar.

4. The fender apron assembly of claim 3, wherein the pillar member is formed through hot-blowing, hydro-forming, or pipe-bending.

5. The fender apron assembly of claim 1, wherein the pillar member includes:
    a pillar portion forming the A-pillar of the vehicle; and
    a coupling portion extending forward from the front end portion of the pillar portion and coupled to the apron member.

6. The fender apron assembly of claim 5, wherein the pillar portion diagonally extends with respect to a longitudinal axis of the vehicle, and the coupling portion is formed to bend at the front end portion of the pillar portion, extends forward, and then forms a straight section along the longitudinal axis of the vehicle.

7. The fender apron assembly of claim 1, wherein the pillar member is coupled with an end portion seated on a rear top of the apron member.

8. The fender apron assembly of claim 1, wherein the apron member has an extending portion which is formed by extrusion and extends toward a front of the vehicle.

9. The fender apron assembly of claim 8, wherein the apron member further has a supporting portion which is coupled to a rear of the extending portion, is formed by extrusion, and has an end portion including a flange portion.

10. The fender apron assembly of claim 9, wherein the flange portion of the supporting portion is configured to support a side of the coupling portion of the pillar member.

11. The fender apron assembly of claim 10, wherein a bracket is coupled to an upper end portion of the coupling portion of the pillar member and is coupled to an upper end portion of the apron member.

12. The fender apron assembly of claim 9, wherein the pillar member is coupled with an end portion seated on a top of the extending portion of the apron member in contact with the supporting portion.

13. The fender apron assembly of claim 8, wherein the extending portion is diagonally cut such that an upward and downward height of the front end portion decreases.

14. The fender apron assembly of claim 1, wherein the apron member is formed by combining a plurality of pipes.

15. The fender apron assembly of claim 1, wherein a cowl member is coupled to an internal side of the apron member while supporting the apron member.

* * * * *